(12) United States Patent
Domazakis et al.

(10) Patent No.: US 9,968,108 B2
(45) Date of Patent: *May 15, 2018

(54) MILK-BASED ALTERNATIVE PRODUCT AND METHOD FOR PRODUCING THE SAME

(71) Applicants: CRETA FARM SOCIETE ANONYME INDUSTRIAL AND COMMERCIAL, Rethymnon (GR); Peter Papadakis, Thessaloniki (GR)

(72) Inventors: Emmanouil Domazakis, Rethymnon (GR); Peter Papadakis, Thessaloniki (GR)

(73) Assignee: CRETA FARM SOCIETE ANONYME INDUSTRIAL AND COMMERCIAL TRADING AS CRETA FARM S.A., Rethymnon (GR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/495,571

(22) Filed: Apr. 24, 2017

(65) Prior Publication Data

US 2017/0223978 A1    Aug. 10, 2017

Related U.S. Application Data

(63) Continuation of application No. 13/892,846, filed on May 13, 2013, now Pat. No. 9,661,863, which is a
(Continued)

(30) Foreign Application Priority Data

Dec. 11, 2009 (EP) .................................. 09386036

(51) Int. Cl.
*A23C 20/00* (2006.01)
*A23C 19/055* (2006.01)
(Continued)

(52) U.S. Cl.
CPC ............ *A23C 20/00* (2013.01); *A23C 19/055* (2013.01); *A23C 19/068* (2013.01); *A23G 9/327* (2013.01);
(Continued)

(58) Field of Classification Search
CPC ..... A23C 19/055; A23C 20/00; A23C 19/054; A23C 11/02
(Continued)

(56) References Cited

U.S. PATENT DOCUMENTS 3,889,004 A    6/1975 Schmidt et al.
4,425,370 A    1/1984 Graves
(Continued)

FOREIGN PATENT DOCUMENTS

CN    101057611 A    10/2007
CN    101380043 A    3/2009
(Continued)

OTHER PUBLICATIONS

Doan, F.J., Soft Curd Milk A Critical Review of the Literature, The Pennsylvania Agricultural Experiment Station, Sep. 6, 1938, vol. 8848, pp. 739-756.
(Continued)

*Primary Examiner* — Jeffrey Mornhinweg
(74) *Attorney, Agent, or Firm* — Oblon, McClelland, Maier & Neustadt, L.L.P.

(57) ABSTRACT

The present invention concerns the production of a milk-based alternative product, using edible oil to substitute at least part of the milk fat. In particular, the present invention concerns the production of a cheese alternative product, an ice cream alternative product, a custard alternative product or a chilled or frozen dessert alternative product, using an edible oil to substitute at least part of the milk fat. Further, a milk based alternative product, in particular a cheese
(Continued)

alternative product, an ice cream alternative product, a custard alternative product or a chilled or frozen dessert alternative product, and the use of an edible oil, in particular olive oil, for the production of the milk-based alternative product are disclosed.

21 Claims, 1 Drawing Sheet

Related U.S. Application Data continuation of application No. 13/202,562, filed as application No. PCT/EP2010/069282 on Dec. 9, 2010, now abandoned.

(51) Int. Cl.
| | |
|---|---|
| A23C 19/068 | (2006.01) |
| A23G 9/32 | (2006.01) |
| A23G 9/40 | (2006.01) |
| A23L 9/10 | (2016.01) |
| C12C 7/165 | (2006.01) |

(52) U.S. Cl.
CPC ............... *A23G 9/40* (2013.01); *A23L 9/12* (2016.08); *C12C 7/165* (2013.01); *A23V 2002/00* (2013.01)

(58) Field of Classification Search
USPC ........................................................ 426/582
See application file for complete search history.

(56) References Cited

U.S. PATENT DOCUMENTS

| | | |
|---|---|---|
| 4,560,560 A | 12/1985 | Narimatsu et al. |
| 5,063,074 A | 11/1991 | Kahn et al. |
| 5,268,190 A | 12/1993 | Gerhard |
| 2004/0091574 A1 | 5/2004 | Soe |
| 2004/0208973 A1 | 10/2004 | Calvert |

FOREIGN PATENT DOCUMENTS

| | | |
|---|---|---|
| DE | 202005013685 U1 | 11/2005 |
| DE | 102005005817 A1 | 8/2006 |
| EP | 0147483 A1 | 7/1985 |
| EP | 0368492 A1 | 5/1990 |
| EP | 0454268-AW | 10/1991 |
| EP | 2005834 A1 | 12/2008 |
| EP | 2 332 422 A1 | 6/2011 |
| EP | 2 332 422 B1 | 8/2012 |
| FR | 2791870 A1 | 10/2000 |
| GB | 1 346 645 | 2/1974 |
| GB | 2 223 927 A | 4/1990 |
| GB | 2 273 234 A | 6/1994 |
| WO | 2004/056186 A1 | 7/2004 |
| WO | WO-2008003122 A1 | 1/2008 |
| WO | WO-2009/056680 A1 | 5/2009 |

OTHER PUBLICATIONS

Noureddini, H., et al., "Densities of Vegetable Oils and Fatty Acids," Papers in Biomaterials, Paper 14 (1992).
Doan "Soft Curd Milk" A critical Review of the Literature The Pennsylvania Agricultural Experiment Station, Department of Diary Husbandry, Sep. 6, 1938, pp. 739-756.
Nair et al. "Yield and functionality of Cheddar cheese as influenced by homogenization of cream", International Dairy Journal 10 (2000), pp. 647-657.
Master thesis by Nielsen and Pihl, 1982.
Declaration from the Faculty Library of Natural and Health Sciences, University of Copenhagen.
Bachmann "Cheese analogues: a review" International Dairy Journal 11 (2001), pp. 505-515.
Jana et al. "Mozzarella Cheese Analogue—A Review", J. Food Sci. Technol., 2003, vol. 40, No. 1, pp. 1-10.
Potter et al. Food Science, 5$^{th}$ edition, 1998.
Yusoff et al. "Palm-Based Imitation Cheese", Palm Oil Dev, 1995.
Dairy Processing Handbook, 1995.

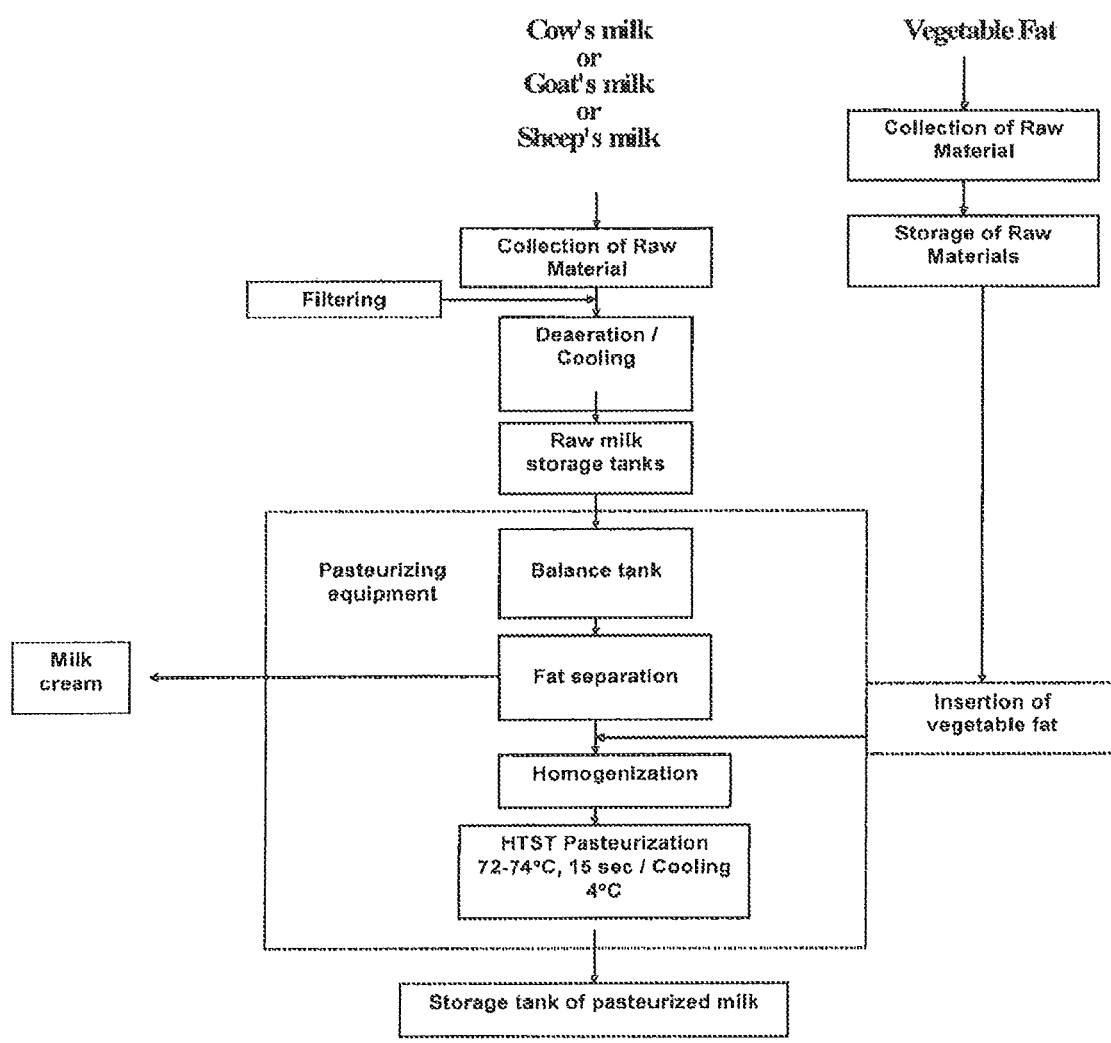

MILK-BASED ALTERNATIVE PRODUCT AND METHOD FOR PRODUCING THE SAME

RELATED APPLICATIONS

This application is a continuation application of U.S. patent application Ser. No. 13/892,846, now U.S. Pat. No. 9,661,863, which is a continuation application of U.S. patent application Ser. No. 13/202,562, filed on Aug. 19, 2011, now abandoned, which, in turn, is the U.S. National Stage of International Application Serial No.: PCT/EP2010/069282, filed Dec. 9, 2010, which claims the benefit of European Application No. 0938603.9, filed on Dec. 11, 2009. The entire teachings of the above applications are incorporated herein by reference.

FIELD OF THE INVENTION

The present invention concerns the production of a milk-based alternative product, using edible oil to substitute at least part of the milk fat. In particular, the present invention concerns the production of a cheese alternative product, an ice cream alternative product, a custard alternative product or a chilled or frozen dessert alternative product, using an edible oil to substitute at least part of the milk fat. Further, a milk-based alternative product, in particular a cheese alternative product, an ice cream alternative product, a custard alternative product or a chilled or frozen dessert alternative product and the use of an edible oil, in particular olive oil, for the production of the milk-based alternative product are disclosed.

BACKGROUND OF THE INVENTION

Nowadays, the consumer preferences have been oriented towards more healthy eating habits. Milk-based products, such as cheese may be a high-fat source, but also an excellent source of calcium and protein. The practice to reduce fat content in cheeses has often been correlated with reduced taste, flavor and texture in the resulting fat-reduced products.

Examples of vegetable-fat based cheese alternative products may be found in the literature, the majority concerning processed cheese manufacturing methods. Fewer attempts have been made to produce cheese products designed to resemble natural/traditional cheeses. To achieve the desirable stability of vegetable oil incorporation in the dairy product, most approaches adopted, include the use of efficient emulsifying agents and adequate amounts thereof.

EP 0 368 492 teaches a method for preparing a cheese product having a low level of saturated fat and cholesterol. The invention makes use of a vegetable fat-based cream added to skim, semi-skimmed or low fat milk, adding to a cheese vat and processing using conventional techniques to form cheese. The said vegetable fat-based cream is prepared by adding a blend of vegetable pasteurized oils, such as soya oil and hydrogenated soya oil and an emulsifier to an aqueous phase comprising a pasteurized blend of water and a stabilizer, such as gelatin. In one embodiment of the invention the vegetable fat comprises a blend of vegetable fats, which has a similar melting point profile to milk fat over the range of 5° C. to 38° C.

Another example of a low cholesterol dairy product may be produced, according to U.S. Pat. No. 5,063,074. Its disclosure relates to the combination of skim milk with a pre-mix comprising a vegetable oil carrier as well as agents, which impart texture and flavoring properties to the milk product. The resultant fluid milk can be pasteurized and stored at refrigerated temperatures for at least six weeks, until it is used to produce a number of dairy products, including hard cheese. In representative formulations, which are disclosed in U.S. Pat. No. 5,063,074, the premix is comprised of vegetable oil, emulsifiers, gums and flavoring agents.

Cheese alternatives having incorporated natural vegetable oils are susceptible to oil exudation phenomena and they are often unacceptable in texture due to reduced firmness. The presence of vegetable oil in partial substitution of dairy fat may affect the process called "syneresis", the process referring to curd and whey separation. Sometimes, the vegetable oil may prevent the necessary expulsion of whey.

The present invention has the object to overcome the disadvantages of the prior art. In particular, the invention aims to provide a cheap, easy to use process for the production of a milk-based alternative product, such as a cheese alternative product, an ice cream alternative product, a custard alternative product or a chilled or frozen dessert alternative product. The process shall be as close to the natural/traditional process for the production of the particular milk-based product, i.e. cheese, ice cream, custard, chilled or frozen desert, as possible. In particular, it is not desired to de-fat the basic milk but rather to substitute at least part of the milk fat by an edible oil.

SUMMARY OF THE INVENTION

The present invention provides a method for producing a cheese alternative product comprising the steps of:
a) providing edible oil at a temperature of about 50 to 55° C.,
b) providing milk at about 2.3 bar, with a flow rate of about 10 to 12 tons/h, at about 55° C.,
c) inserting the oil at about 2.5 bar, with a flow rate of about 500 to 2000 liters/h, into the milk, to obtain a mixture,
d) subjecting the mixture to mild homogenization at about 10 bar,
e) pasteurizing the homogenized mixture at about 72° C. for about 15 sec,
f) cooling the pasteurized mixture to about 4 to 6° C.,
g) subjecting the mixture to a curd formation,
h) performing a curd and whey separation,
wherein a cheese alternative product is obtained, which contains ≥5 (w/w) % fat, preferably about 5 to 30 (w/w) % fat, more preferably about 5 to 25 (w/w) % fat and most preferably about 5 to 20 (w/w) % fat.

The invention further comprises a cheese alternative product, obtainable by a method comprising the steps of:
a) providing edible oil at a temperature of about 50 to 55° C.,
b) providing milk at about 2.3 bar, with a flow rate of about 10 to 12 tons/h, at about 55° C.,
c) inserting the oil at about 2.5 bar, with a flow rate of about 500 to 2000 liters/h, into the milk, to obtain a mixture,
d) subjecting the mixture to mild homogenization at about 10 bar,
e) pasteurizing the homogenized mixture at about 72° C. for about 15 sec,
f) cooling the pasteurized mixture to about 4 to 6° C.,
g) subjecting the mixture to a curd formation,
h) performing a curd and whey separation,
wherein a cheese alternative product is obtained, which contains ≥5 (w/w) % fat, preferably about 5 to 30 (w/w) % fat, more preferably about 5 to 25 (w/w) % fat and most preferably about 5 to 20 (w/w) % fat.

Further, the invention discloses the use of an edible oil for the production of a cheese alternative product, wherein the cheese alternative product contains ≥5 (w/w) % fat, preferably about 5 to 30 (w/w) % fat, more preferably about 5 to 25 (w/w) % fat and even more preferably about 5 to 20 (w/w) %.

Moreover, the invention comprises a method for producing a milk-based alternative product, in particular an ice cream alternative product, a custard alternative product or a chilled or frozen dessert alternative product, comprising the steps of:

a) providing edible oil at a temperature of about 50 to 55° C.,
b) providing milk at about 2.3 bar, with a flow rate of about 10 to 12 tons/h, at about 55° C.,
c) inserting the oil at about 2.5 bar, with a flow rate of about 500 to 2000 liters/h, into the milk, to obtain a mixture,
d) subjecting the mixture to mild homogenization at about 10 bar,
e) pasteurizing the homogenized mixture at about 72° C. for about 15 sec,
f) cooling the pasteurized mixture to about 4 to 6° C.,
g) further processing of the pasteurized mixture in order to obtain a milk-based product, such as an ice cream, a custard, a chilled or frozen dessert, using appropriate methodologies known in the art suited for each product type, wherein a milk-based alternative product is obtained, which contains ≥5 (w/w) % fat, preferably about 5 to 30 (w/w) % fat, more preferably about 5 to 25 (w/w) % fat and most preferably about 5 to 20 (w/w) % fat.

The invention further comprises a milk-based alternative product, in particular an ice cream alternative product, a custard alternative product or a chilled or frozen dessert alternative product, obtainable by a method comprising the steps of:

a) providing edible oil at a temperature of about 50 to 55° C.,
b) providing milk at about 2.3 bar, with a flow rate of about 10 to 12 tons/h, at about 55° C.,
c) inserting the oil at about 2.5 bar, with a flow rate of about 500 to 2000 liters/h, into the milk, to obtain a mixture,
d) subjecting the mixture to mild homogenization at about 10 bar,
e) pasteurizing the homogenized mixture at about 72° C. for about 15 sec,
f) cooling the pasteurized mixture to about 4 to 6° C.,
g) further processing of the pasteurized mixture in order to obtain a milk-based product, such as an ice cream, a custard, a chilled or frozen dessert, using appropriate methodologies known in the art suited for each product type, wherein a milk-based alternative product is obtained, which contains ≥5 (w/w) % fat, preferably about 5 to 30 (w/w) % fat, more preferably about 5 to 25 (w/w) % fat and most preferably about 5 to 20 (w/w) % fat.

Further, the invention discloses the use of an edible oil for the production of a milk-based alternative product, in particular an ice cream alternative product, a custard alternative product or a chilled or frozen desert alternative product, wherein the milk-based alternative product contains ≥5 (w/w) % fat, preferably about 5 to 30 (w/w) % fat, more preferably about 5 to 25 (w/w) % fat and even more preferably about 5 to 20 (w/w) % fat.

BRIEF DESCRIPTION OF THE FIGURE

The FIGURE shows a flow diagram of the inventive process. Specifically, the FIGURE shows the production of vegetable oil-containing milk based products.

DETAILED DESCRIPTION OF THE INVENTION

The present invention relates to emulsion-type foodstuff in general and, in particular, to milk-based alternative products, such as cheese alternative products, ice cream alternative products, custard alternative products or chilled or frozen dessert alternative products, made by incorporating vegetable oil into skimmed milk and further processing the resulting mixture under selective conditions, to form a milk-based alternative product having the desired texture and flavor.

In particular, the inventors provide a method for producing a cheese alternative product comprising the steps of:

a) providing edible oil at a temperature of about 50 to 55° C.,
b) providing milk at about 2.3 bar, with a flow rate of about 10 to 12 tons/h, at about 55° C.,
c) inserting the oil at about 2.5 bar, with a flow rate of about 500 to 2000 liters/h, into the milk, to obtain a mixture,
d) subjecting the mixture to mild homogenization at about 10 bar,
e) pasteurizing the homogenized mixture at about 72° C. for about 15 sec,
f) cooling the pasteurized mixture to about 4 to 6° C.,
g) subjecting the mixture to a curd formation,
h) performing a curd and whey separation, wherein a cheese alternative product is obtained, which contains ≥5 (w/w) % fat, preferably about 5 to 30 (w/w) % fat, more preferably about 5 to 25 (w/w) % fat and most preferably about 5 to 20 (w/w) % fat.

In a particular preferred embodiment, the milk is whole milk, semi-skimmed milk or skimmed milk, preferably skimmed milk.

An edible oil, in particular a vegetable oil-containing alternative cheese is produced by removing the milk fat from the milk, then inserting therein an amount of vegetable oil, homogenizing the resulting mixture and subjecting said vegetable oil-containing milk into selective cheese processing conditions. The resulting alternative cheese may be further used to produce processed type cheeses.

The present invention provides cheese product alternatives/analogues resembling the related natural/traditional cheese products. The cheese alternative products are prepared by homogenizing a vegetable fat into a skimmed or semi-skimmed milk and further processing the oil-containing milk, using conditions favoring syneresis.

The stable incorporation of vegetable oil in the cheese product, is herein assured by:

i) The oil insertion system that introduces the oil into the milk flow at conditions allowing the dispersion of oil globules in the milk carrier. Using the herein described oil insertion system, mild homogenization conditions may be applied, favoring syneresis and promoting whey separation. Intense homogenization, on the other hand, may dramatically increase the amount of oil globules. This means, that a greater amount of available casein proteins should become adsorbed onto the surface of oil globules, a phenomenon that destabilizes the curd, by reducing syneresis and delaying whey separation. Thus, a mild homogenization procedure is preferred.

ii) The selective cheese making conditions, optimized to ensure consistently stable organoleptic features.

The vegetable oil is subjected to mild heating, until a temperature of about 50-55° C. has been reached. Then, the vegetable oil is inserted into the skimmed milk. The skimmed milk forms the carrier in the continuous flow system, wherein the oil is inserted. In a flow diagram, the oil insertion system is situated immediately after the milk cream separator. The skimmed milk passes at a pressure of approximately 2.3 bars and a flow rate at about 10 tons/hour-12 tons/hour. The vegetable oil insertion system comprises a 30-40 mm diameter tube, along which the vegetable oil is passed at a pressure of 2.5 bars and a flow rate of approximately 500-2000 liters per hour, preferably at > or =1000 liters per hour, more preferably at > or =1500 liters per hour and even more preferably at 2000 liters per hour, depending on the intended oil/milk mixing ratio at the time of insertion. Next, the oil-containing milk is directed to a homogenizer, whereby the oil droplets are reduced in size and homogenously dispersed in milk, following a mild homogenization at 10 bar. Then, the resulting oil-containing milk is held at 72° C. for 15 sec, cooled down to 4-6° C. and stored. Curd formation follows, under suitable conditions (as shown in the Examples), by the addition of suitable amounts of rennet and/or microbial starter cultures. Finally curd-whey separation procedure follows, using optimized conditions, suited for each product type, as described in the Examples. Optionally, the resulting cheese alternative products are used for the making of processed type cheeses, according to the common methods known in the art.

Within the context of the present invention, the term "oil", whenever used herein, comprises any edible oil fit for human consumption or mixtures thereof. Preferably, the oil is a vegetable oil. Some of the many different kinds of edible vegetable oils, that can be used, include olive oil, palm oil, soybean oil, canola oil, pumpkin seed oil, corn oil, rape oil, sunflower oil, safflower oil, peanut oil, walnut oil, wheat germ oil, grape seed oil, sesame oil, argan oil, rice bran oil and mixtures thereof. Many other kinds of vegetable oils that are used for cooking can, however, also be used according to the present application. From the oils mentioned above, olive oil, sunflower oil, corn oil, rape oil and mixtures thereof are especially preferred, with olive oil being the most preferred oil. Especially preferred, the oil is virgin olive oil or extra virgin olive oil. Moreover, it is also preferred that the oil used according to the present application is an organic oil.

The milk used for the preparation of the cheese may be whole milk or partially or wholly skimmed milk. The vegetable oil may be used at least in partial substitution of milk fat. Milk can be of cow, goat, sheep or buffalo origin, or any combination thereof.

The use of stabilising agents or/and emulsifying agents is possible, but not compulsory.

In a preferred embodiment, inserting the oil in step c) is performed by an insertion tube with a diameter of about 32 mm.

In a further preferred embodiment the flow rate of the edible oil in step c) is about 1000 to 2000 liters/h, preferably ≥1000 liters/h, more preferably ≥1500 liters/h and most preferably about 2000 liters/h.

In another embodiment the homogenization in step d) uses a two-stage homogenizer with a piston diameter of about 55 mm.

The amount of the oil that is to be used for the preparation of the oil-containing milk-based products particularly depends on the kind of oil, the kind of milk and the intended oil end concentration of the cheese alternative products to be prepared. An exemplary amount of the oil concentration of the mixture in step f) is between about 4 to 17 (w/w) %, more preferably about 8 to 17 (w/w) % and even more preferably about 9 to 17 (w/w) %.

The resulting product of the present invention may be a cheese alternative product from the list of cheese alternatives, including: semi-hard cheese type (such as, semi-hard pasta fillata type, etc.), hard cheese type, white cheese in brine, whey cheese type, soft cheese type, surface ripened cheese type, blue veined cheese type and spreadable cheese type.

According to the present invention, the oil-containing milk-based product contains the oil as a substitute for the milk fat content. The cheese alternative product may, however, also contain both vegetable oil and milk fat.

A further object of the present invention is a cheese alternative product, obtainable by a method comprising the steps of:
a) providing edible oil at a temperature of about 50 to 55° C.,
b) providing milk at about 2.3 bar, with a flow rate of about 10 to 12 tons/h, at about 55° C.,
c) inserting the oil at about 2.5 bar, with a flow rate of about 500 to 2000 liters/h, into the milk, to obtain a mixture,
d) subjecting the mixture to mild homogenization at about 10 bar,
e) pasteurizing the homogenized mixture at about 72° C. for about 15 sec,
f) cooling the pasteurized mixture to about 4 to 6° C.,
g) subjecting the mixture to a curd formation,
h) performing a curd and whey separation,
wherein a cheese alternative product is obtained, which contains ≥5 (w/w) % fat, preferably about 5 to 30 (w/w) % fat, more preferably about 5 to 25 (w/w) % fat and most preferably about 5 to 20 (w/w) % fat.

In a preferred embodiment the curd formation and the curd and whey separation are performed by:
i) inoculating the pasteurized mixture with suitable amounts of a mesophilic and/or thermophilic and/or propionic acid starter culture and/or rennet to coagulate the mixture,
j) subjecting the curd to syneresis favoring conditions to separate the curd from the whey.

The invention further encompasses a semi-hard cheese alternative product obtainable by the inventive process, wherein:
the mixture comprises a fat/protein ratio of 0.4 to 0.9,
the mixture is heated up to the temperature of 34 to 36° C.,
the rennet comprises a composition of 90% chymosin and 10% pepsin,
the coagulation is accomplished at 34 to 36° C. for 35 to 45 min,
cutting the curd into up to 2 to 5 mm grains, stirring the grains for ≤12 min at a gradually increasing temperature to reach ≤42° C., further stirring the grains for ≤15 min at a gradually increasing temperature to reach ≤51° C. and further stirring at a steady temperature of ≤51° C. for ≤45 min,
in a preferred embodiment, the curd has a final pH of about 6.2 to 6.25.
the curd is pressed at 80 to 100 psi for 40 min before subjecting to traditional cheese aging.

The invention further encompasses another type of a semi-hard cheese alternative product, obtainable by the inventive process, wherein:
the mixture comprises a fat/protein ratio of 0.4 to 0.5, the mixture is heated up to the temperature of 31 to 32° C., the rennet comprises a composition of 90% chymosin and 10% pepsin, the coagulation is accomplished at 31 to 32° C. for 35 to 45 min, cutting the curd into up to 2 to 5 mm grains, draining off about 40 (w/w) % of whey, adding 35 (w/w) % amount of water of a temperature of 36° C., heating and stirring the grains at 34° C. for 40 min, in a preferred embodiment, the curd has a final pH of about 5.4-5.6, the curd is pressed at 80 to 100 psi for 40 min before subjecting to natural/traditional cheese aging.

Additionally, a hard cheese alternative product is obtainable, in which:

the mixture comprises a fat/protein ratio of 1.0 to 1.1, the mixture is heated up to the temperature of 34 to 36° C., the rennet comprises a composition of 90% chymosin and 10% pepsin, the coagulation is accomplished at 34 to 36° C. for 35 min, cutting the curd into up to 5 to 8 mm grains, heating and stirring the curd grains up to 46° C., replacing 20% of the whey with water of a temperature of 45° C., continue stirring the grains for up to about 48° C. and resting the curd at about 48° C. for 10 min, and the curd is pressed at 80 to 100 psi before subjecting to natural/traditional cheese aging, in a preferred embodiment the curd has a final pH of about 5.3 to 5.4.

Further disclosed is a brine cheese alternative, obtainable by the inventive process, wherein:

the mixture comprises a fat/protein ratio of 0.4 to 0.9, the mixture is heated up to the temperature of ≤38° C., the pasteurized mixture is inoculated with a suitable bulk starter culture and rennet of 90% chymosin and 10% pepsin, the coagulation is accomplished at ≤38° C. for about 50 min, cutting the curd into 1 cm×1 cm×2 cm to 2 cm×2 cm×2 cm grains and resting the curd for ≤65 min, and the curd is transferred to molds and whey drainage occurs due to gravity.

Further disclosed is the use of an edible oil for the production of a cheese alternative product, wherein the cheese alternative product contains ≥5 (w/w) % fat, preferably about 5 to 30 (w/w) % fat, more preferably about 5 to 25 (w/w) % fat and most preferably about 5 to 20 (w/w) % fat.

Moreover, the inventors provide a method for producing a milk-based alternative product, in particular an ice cream alternative product, a custard alternative product or a chilled or frozen dessert alternative product, comprising the steps of:

a) providing edible oil at a temperature of about 50 to 55° C., b) providing milk at about 2.3 bar, with a flow rate of about 10 to 12 tons/h, at about 55° C., c) inserting the oil at about 2.5 bar, with a flow rate of about 500 to 2000 liters/h, into the milk, to obtain a mixture, d) subjecting the mixture to mild homogenization at about 10 bar, e) pasteurizing the homogenized mixture at about 72° C. for about 15 sec, f) cooling the pasteurized mixture to about 4 to 6° C., g) further processing of the pasteurized mixture in order to obtain a milk-based product, such as an ice cream, a custard, a chilled or frozen dessert, using appropriate methodologies known in the art suited for each product type, wherein a milk-based alternative product is obtained, which contains ≥5 (w/w) % fat, preferably about 5 to 30 (w/w) % fat, more preferably about 5 to 25 (w/w) % fat and most preferably about 5 to 20 (w/w) % fat.

In a particular preferred embodiment, the milk is whole milk, semi-skimmed milk or skimmed milk, preferably skimmed milk.

An edible oil (in particular vegetable oil)-containing milk-based alternative product is produced by removing the milk fat from the milk, then inserting therein an amount of vegetable oil, as in the steps (a) to (c), homogenizing the resulting mixture, as in step (d) and subjecting said vegetable oil-containing milk to milk-based product processing conditions. The resulting milk-based alternative product may be further used to produce successive products.

The present invention provides milk-based product alternatives/analogues resembling the related natural/traditional milk-based products. The milk-based alternative products, such as ice cream alternative products, custard alternative products or chilled or frozen dessert alternative products, are prepared by inserting an amount of vegetable fat into a skimmed or semi-skimmed milk, as aforementioned, subjecting the resulting mixture to mild homogenization and further processing the resulting oil-containing milk according to methods known in the art for the making of ice cream, custards, or chilled or frozen desserts.

For example, for the making of an alternative ice-cream product, the vegetable oil is first subjected to mild heating, until a temperature of about 50-55° C. has been reached. Then, the vegetable oil is inserted in the skimmed milk. The skimmed milk forms the carrier in the continuous flow system, wherein the oil is inserted. In a flow diagram, the oil insertion system is situated immediately after the milk cream separator. The skimmed milk passes at a pressure of approximately 2.3 bars and a flow rate at about 10 tons/hour to 12 tons/hour. The vegetable oil insertion system comprises a 30-40 mm diameter tube, along which the vegetable oil is passed at a pressure of 2.5 bars and a flow rate of approximately 500-2000 liters/hour, preferably at ≥1000 liters/hour, more preferably at ≥1500 liters/hour and even more preferably at 2000 liters/hour, depending on the intended oil/milk mixing ratio at the time of insertion. Next, the oil-containing milk is directed to a homogenizer, whereby the oil droplets are reduced in size and homogenously dispersed in the milk, following a mild homogenization at 10 bar. Then, the resulting oil-containing milk is held at 72° C. for 15 sec, cooled down to 4-6° C. and stored. Following cooling, a primary ingredient or a mixture thereof is added and mixed therein. The primary ingredient is preferably selected from the group comprising sweeteners, stabilizers and thickeners. Examples of sweeteners include sucrose, fructose, glucose, aspartame, sorbitol, etc. Appropriate stabilizers and thickeners include, for example, carrageenan, sodium alginate, etc. The procedure follows with the admixture of a secondary ingredient or a mixture thereof. The secondary ingredient for the making of ice-cream is preferably selected from the group comprising fat or a fat containing ingredient/composition, such as milk cream, milk fat, vegetable fat or oil, and emulsifiers, such as egg yolk, lecithin, glycerine monostearate, PGPR, tweens, etc. The quantities of the primary and secondary ingredients used are in accordance with supplier specifications and regulation. For all the added ingredients to be properly dissolved, the resulting mixture is then subjected to a heat treatment up to 68° C. Following this heat treatment, the mixture is homogenized at about 100 bar and up to 200 bar and pasteurized at 78-80° C. for 20-25 sec. The pasteurized oil containing-milk mixture is cooled to approximately 5° C. and incubated for at least 4 hours at the same temperature for "aging". Following aging, the mixture is subjected to freezing and whipping ("churning"), for the size of fat crystals to be reduced and sufficient air to be incorporated in the mass of the mixture. The addition of aromas (i.e. artificial and/or natural food grade, such as vanillin, strawberry extracts, etc.) and colourings (i.e. artificial and/or natural food grade, such as cochineal, beta-carotene, annatto, etc.) and optionally garniture (such as chocolate chips, nuts, etc) may be done in this step. Finally, the resulting mixture is filled in appropriate containers and is subjected to further freezing (e.g. blast freezer conditions: −40° C.), before storage at −20° C.

For example, for the making of an alternative custard, the vegetable oil is first subjected to mild heating, until a temperature of about 50-55° C. has been reached. Then, the vegetable oil is inserted in the skimmed milk. The skimmed milk forms the carrier in the continuous flow system, wherein the oil is inserted. In a flow diagram, the oil insertion system is situated immediately after the milk cream separator. The skimmed milk passes at a pressure of approximately 2.3 bars and a flow rate at about 10 tons/hour to 12 tons/hour. The vegetable oil insertion system comprises a 30-40 mm diameter tube, along which the vegetable oil is passed at a pressure of 2.5 bars and a flow rate of approximately 500-2000 liters/hour, preferably at 1000 liters/hour, more preferably at 1500 liters/hour and even more preferably at 2000 liters/hour, depending on the intended oil/milk mixing ratio at the time of insertion. Next, the oil-containing milk is directed to a homogenizer, whereby the oil droplets are reduced in size and homogenously dispersed in the milk, following a mild homogenization at 10 bar. Then, the resulting oil-containing milk is held at 72° C. for 15 sec, cooled down to 4-6° C. and stored. Following cooling, a primary ingredient or a mixture thereof is added and mixed therein. The primary ingredient is preferably selected from the group comprising sweeteners, stabilizers and thickeners. Examples of sweeteners include sucrose, fructose, glucose, aspartame, sorbitol, etc. Appropriate stabilizers and thickeners include, for example, carrageenan, sodium alginate, etc. The procedure follows with the admixture of a secondary ingredient or a mixture thereof. The secondary ingredient for the making of an alternative custard is preferably selected from the group comprising starch, modified starch, wheat semolina, etc. The quantities of the primary and secondary ingredients used depend on the type of final milk-based product and are in accordance with supplier specifications and regulation. Aromas (i.e. artificial and/or natural food grade, such as vanillin, strawberry extracts, etc.) and colourings (i.e. artificial and/or natural food grade, such as cochineal, beta-carotene, annatto, etc.) and optionally chocolate, nuts, etc may be added at this step, according to regulation and supplier specifications. Heat treatment under continuous stirring is then carried out at 90° C., for the ingredients to be properly dissolved. The mixture is cooled to 70° C. before packaging. Finally, the packaged product is stored at 4° C.

The term "oil" is used as defined above.

The milk used for the preparation of the milk-based alternative product may be whole milk or partially or wholly skimmed milk. The vegetable oil may be used at least in partial substitution of milk fat. Milk can be of cow, goat, sheep or buffalo origin, or any combination thereof. Stabilising agents or/and emulsifying agents may be used, if necessary, and according to the each intended product type.

In a preferred embodiment, inserting the oil in step c) is performed by an insertion tube with a diameter of about 32 mm.

In a further preferred embodiment the flow rate of the edible oil in step c) is about 1000 to 2000 liters/h, preferably ≥1000 liters/h, more preferably ≥1500 liters/h and most preferably about 2000 liters/h.

In another embodiment the homogenization in step d) uses a two-stage homogenizer with a piston diameter of about 55 mm.

The amount of the oil that is to be used for the preparation of the oil-containing milk-based products particularly depends on the kind of oil, the kind of milk and the intended oil end concentration of the milk-based alternative products to be prepared. An exemplary amount of the oil concentration of the mixture in step f) is between about 5 to 30 (w/w) %, more preferably 5 to 25 (w/w) % and even more preferably about 5 to 20 (w/w) %.

According to the present invention, the oil-containing milk-based product contains the oil as a substitute for the milk fat content. The milk-based alternative product may, however, also contain both vegetable oil and milk fat.

A further object of the present invention is a milk-based alternative product, in particular an ice cream alternative product, a custard alternative product or a chilled or frozen dessert alternative product, obtainable by a method comprising the steps of:

a) providing edible oil at a temperature of about 50 to 55° C., b) providing milk at about 2.3 bar, with a flow rate of about 10 to 12 tons/h, at about 55° C., c) inserting the oil at about 2.5 bar, with a flow rate of about 500 to 2000 liters/h, into the milk, to obtain a mixture, d) subjecting the mixture to mild homogenization at about 10 bar, e) pasteurizing the homogenized mixture at about 72° C. for about 15 sec, f) cooling the pasteurized mixture to about 4 to 6° C., g) further processing of the pasteurized mixture in order to obtain a milk-based product, such as an ice cream, a custard, a chilled or frozen dessert, using appropriate methodologies known in the art suited for each product type, wherein a milk-based alternative product is obtained, which contains ≥5 (w/w) % fat, preferably about 5 to 30 (w/w) % fat, more preferably about 5 to 25 (w/w) % fat and most preferably about 5 to 20 (w/w) % fat.

Further disclosed is the use of an edible oil for the production of a milk-based alternative product, in particular an ice cream alternative product, a custard alternative product or a chilled or frozen desert alternative product, wherein the milk-based alternative product contains ≥5 (w/w) % fat, preferably about 5 to 30 (w/w) % fat, more preferably about 5 to 25 (w/w) % fat and even more preferably about 5 to 20 (w/w) % fat.

The invention will be further understood by the skilled person with respect to the FIGURE, which shows a flow diagram of the inventive process, and the examples. In particular, the flow diagram in the FIGURE shows the production of vegetable oil-containing milk based products.

EXAMPLES

Example 1: An Exemplary Method for the Making of a Semi-Hard Cheese Alternative of Pasta Fillata Type Raw milk of <4° C., was preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour.

Next, the oil-containing skimmed milk with a preferred ratio of fat/protein: 0.8-0.9 is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72° C. for 15 sec, and then cooled to 4-6° C. The resulting oil-containing milk mixture is preheated up to 34-36° C., then inoculated with mesophilic and/or thermophilic starter culture and rennet (90% chymosin-10% pepsin) and left under conditions of 34-36° C. for 35-45 minutes, to acidify and coagulate. The curd is then cut into grains of <2-5 mm size, while being stirred, to commence syneresis. Following cutting of the curd, syneresis is further promoted by a heat treatment of two stages, wherein a temperature range of 48-51° C. is applied. The heat treatment follows two successive "stirring & heating" stages, whereby the temperature is gradually increased, the two successive "stirring & heating" stages, comprising of: i) 12 min at <42° C., ii) 8 min at <51° C. Then, the curd is subjected into a final stirring stage of a duration of <45 min, whereby the temperature of the curd is kept at <51° C. and a final pH value of 6.25 is obtained.

The residual whey is removed from the curd, using various ways known in a person of ordinary skill, depending on the intended type of cheese. For the making of semi-hard cheese alternatives, including of pasta fillata type, pressing is adopted for a duration of 40 min, under conditions of 80-100 psi.

Then, the common cheese processing steps follow, using the conditions suited for the preparation of semi-hard cheese product of pasta fillata type, known in a person of ordinary skill.

Example 2: An Exemplary Method for the Making of a Semi-Hard Cheese Alternative of Pasta Fillata Type, Having Reduced Fat Raw milk of <4° C., was preheated up to $<_{55}$° C. Then, the preheated milk is introduced into a centrifugal separator, resulting in 50 vol-% fat cream and 0.03 fat vol-% skimmed milk.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour. Next, the oil-containing skimmed milk with a preferred ratio of fat/protein: 0.4-0.5 is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72-74° C. for 15 sec and then cooled to 4-6° C. The resulting oil-containing milk mixture is preheated up to 34-36° C., inoculated with a suitable amount of mesophilic-thermophilic starter culture and rennet, comprising 90% chymosin-10% pepsin and left under conditions of 34-36° C. for 35-45 minutes, to acidify and coagulate. The curd is then cut into grains of <2-5 mm size, while being stirred, to commence syneresis. Following cutting of the curd, syneresis is further promoted by a heat treatment of two stages, wherein a temperature range of 38-48° C. is applied. The heat treatment follows two successive "stirring & heating" stages, whereby the temperature is gradually increased, the two successive "stirring & heating" stages, comprising of: i) 8 min at <38° C., ii) 15 min at <48° C. Then, the curd is subjected into a final stirring stage of a duration of <35 min, whereby the temperature of the curd is kept at <48° C., and a final pH value of 6.2 is obtained.

The residual whey is removed from the curd, using various ways known in a person of ordinary skill, depending on the intended type of cheese. For the making of semi-hard cheese alternatives, including of pasta fillata type, pressing is adopted for a duration of 40 min, under conditions of 80-100 psi.

The resulting product is further processed using conventional processing steps, suited for the preparation of semi-hard cheese product of pasta fillata type, known by a person of ordinary skill.

Example 3: An Exemplary Method for the Making of a White Cheese Alternative in Brine a) Raw milk of <4° C., was preheated up to <55° C. Then, the preheated milk is introduced into a centrifugal separator, resulting in 50 vol-% fat cream and 0.03 vol-% skimmed milk.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour.

Next, the oil-containing skimmed milk with a preferred ratio of fat/protein: 0.8-0.9 is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72° C. for 15 sec and then cooled to 4-6° C. The resulting oil-containing milk mixture is preheated up to 36-38° C., then inoculated with a suitable amount bulk starter culture and rennet (90% chymosin-10% pepsin) and left under conditions of 36-38° C. for 50 minutes to acidify and coagulate. The curd is then cut into cubes of <1 cm×1 cm×2 cm or 2 cm×2 cm×2 cm in size, depending on the milk origin, i.e. from cow or sheep, respectively, to commence syneresis. Then, the curd is left at rest for a period of 30-65 min, depending on the milk origin, while the whey is separated from the curd. Afterwards, the biggest volume of whey is removed and the curd is added to molds where natural drainage occurs.

The resulting product is further processed using conventional processing steps, suited for the preparation of white cheese in brine, known by a person of ordinary skill.

b) Raw milk of <4° C., was preheated up to <55° C. Then, the preheated milk is introduced into a centrifugal separator, resulting in 50 vol-% fat cream and 0.03 vol-% skimmed milk.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour.

Next, the oil-containing skimmed milk with a preferred ratio of fat/protein: 0.8-0.9 is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72° C. for 15 sec and then cooled to 4-6° C. The resulting oil-containing milk mixture is preheated up to 34-36 C, then inoculated with a suitable amount bulk starter culture and rennet (90% chymosin-10% pepsin) and left under conditions of 34-36° C. for 50 minutes to acidify and coagulate. The curd is then cut into cubes of <1 cm×1 cm×2 cm or 2 cm×2 cm×2 cm in size, depending on the milk origin, i.e. from cow or sheep, respectively, to commence syneresis. Then, the curd is left at rest for a period of 30-65 min, depending on the milk origin, while the whey is separated from the curd. Afterwards, the biggest volume of whey is removed and the curd is added to molds where natural drainage occurs.

The resulting product is further processed using conventional processing steps, suited for the preparation of white cheese in brine, known by a person of ordinary skill.

Example 4: An Exemplary Method for the Making of a Type of White Cheese Alternative in Brine, Having Reduced Fat a) Raw milk of <4° C., was preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour.

Next, the oil-containing skimmed milk with a preferred ratio of fat/protein: 0.4-0.5 is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72° C. for 15 sec and then cooled to 4-6° C. The resulting oil-containing milk mixture is preheated up to 35-36 C, then inoculated with a suitable amount of bulk starter culture and rennet (90% chymosin-10% pepsin) and left under conditions of 35-36° C. for 50 minutes, to acidify and coagulate. The curd is then cut into cubes of <1 cm×1 cm×2 cm or 2 cm×2 cm×2 cm in size, depending on the milk origin, i.e. from cow or sheep, respectively, to commence syneresis. Then, the curd is left at rest for a period of 30-35 min, while the whey is separated from the curd. Afterwards, the biggest volume of whey is removed and the curd is added to molds, where natural drainage occurs.

The resulting product is further processed using conventional processing steps, suited for the preparation of white cheese in brine, known by a person of ordinary skill.

b) Raw milk of <4° C., was preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour.

Next, the oil-containing skimmed milk with a preferred ratio of fat/protein: 0.4-0.5 is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72° C. for 15 sec and then cooled to 4-6° C. The resulting oil-containing milk mixture is preheated up to 34-36° C., then inoculated with a suitable amount of bulk starter culture and rennet (90% chymosin-10% pepsin) and left under conditions of 34-36° C. for 50 minutes, to acidify and coagulate. The curd is then cut into cubes of <1 cm×1 cm×2 cm or 2 cm×2 cm×2 cm in size, depending on the milk origin, i.e. from cow or sheep, respectively, to commence syneresis. Then, the curd is left at rest for a period of 30-35 min, while the whey is separated from the curd. Afterwards, the biggest volume of whey is removed and the curd is added to molds, where natural drainage occurs.

The resulting product is further processed using conventional processing steps, suited for the preparation of white cheese in brine, known by a person of ordinary skill.

Example 5: An Exemplary Method for the Making of Another Type of Semi-Hard Cheese Alternative, Having Reduced Fat Raw milk of <4° C., was preheated up to <55° C. Then, the preheated milk is introduced into a centrifugal separator, resulting in 50 vol-% fat cream and 0.03 vol-% fat skimmed whey.

Vegetable oil is preheated to 55° C. and then introduced into the skimmed milk at a pressure of 2.5 bars and a flow rate of approximately 1000-2000 liters per hour, preferably at >1500 liters per hour and even more preferably at 2000 liters per hour, via an insertion system of diameter 32 mm. The skimmed milk passes at a pressure of approximately 2.3 bars and a flow rate at 10 tons/hour-12 tons/hour.

Next, the oil-containing skimmed milk is directed along a tube to a homogenizer, wherein is subjected to mild homogenization. For example, homogenization may be performed using a conventional two-stage homogenizer (Piston diameter 55 mm) at 10 bar. The homogenized oil-containing milk mixture is pasteurized at 72° C. for 15 sec, and then cooled to 4-6° C. The resulting oil-containing milk mixture with a preferred ratio of fat/protein: 0.4-0.5 is preheated up to 31-32° C., then inoculated with a suitable mesophilic-thermophilic starter culture and rennet comprising of 90% chymosin-10% pepsin and left under conditions of 31-32° C. for 35-45 minutes, to acidify and coagulate. The curd is then cut into grains of <2-5 mm size, while being stirred, to commence syneresis. Following cutting of the curd, the whey is drained from the tank in a proportion of 40%. Then, 35% of warm water in 36° C. is added and a heat treatment follows, under stirring, wherein a temperature range of 34° C. is applied for 40 min and a final pH value of 5.4-5.6 is obtained. For the making of this type of semi-hard cheese alternative, pressing is adopted for a duration of 40 min, under conditions of 80-100 psi.

The resulting product is further processed using conventional processing steps, suited for the preparation of a semi-hard cheese product, known by a person of ordinary skill.

Example 6: An Exemplary Method for the Making of a Whey Cheese Alternative

Whey of <4° C., was preheated up to <55° C. Then, the pre-heated whey is introduced into a centrifugal separator, resulting in 50 vol-% fat cream and 0.03 vol-% fat skimmed milk.

Vegetable oil is preheated to 55° C. and then introduced into the skimmed whey at a flow rate 1000-2000 liters per hour, preferably at >1500 liters per hour and even more preferably at 2000 liters per hour, via an insertion system of diameter 32 mm, fitted in close proximity and parallel configuration to the entrance system of fat cream re-feeding. Next, the oil-containing skimmed whey is directed along a tube to a homogenizer, wherein is subjected to homogenization, at 120 bar. Homogenization may be performed using a conventional two-stage homogenizer (Piston diameter 55 mm). The homogenized oil-containing whey mixture is subjected to a heat treatment, applying a gradually increasing temperature up to 96° C. At the temperature of 60° C. (<65° C.), 9% skimmed milk is added and the heat treatment continues until the temperature of 96° C. is reached. The resulting product is then left at rest at the temperature of 96° C. for 20-30 minutes. By that time, the coagulum is found to float on the surface of the extracted whey. Then, the whey is drained off, while the coagulum is transferred to conditions of 4° C.

Example 7: An Exemplary Method for the Making of a Hard Cheese Alternative

Raw milk of <4° C., was preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed whey at a flow rate 1000-2000 liters per hour, preferably at >1500 liters per hour and even more preferably at 2000 liters per hour, via an insertion system of diameter 32 mm, fitted in close proximity and parallel configuration to the entrance system of fat cream re-feeding.

Next, the oil-containing skimmed milk is directed along a tube to a homogenizer, wherein is subjected to mild homogenization. For example, homogenization may be performed using a conventional two-stage homogenizer (Piston diameter 55 mm) at 10=bar. The homogenized oil-containing milk mixture is pasteurized at 72° C. for 15 sec and then cooled to 4-6° C. The resulting oil-containing milk mixture with a preferred ratio of fat/protein: 1.0-1.1 is preheated up to 34-36° C., inoculated with a suitable mix of mesophilic-thermophilic-propionic acid starter culture and rennet (90% chymosin-10% pepsin) and left to coagulate under conditions of 34-36° C. for 35 minutes. The curd, is then cut into grains of <5-8 mm size, while being stirred, to commence syneresis. To promote syneresis, the coagulum is heated to the range 48-49° C. for 8 minutes, while stirred. During this step of heat treatment and while temperature reaches the 46° C., an amount of 20% of whey is replaced by an equal amount of water. The water added is of 45° C. The heat treatment continues, under stirring, until the temperature of the mixture reaches the 48.5° C. At this temperature, the mixture comprising curd, water and whey, is left to rest for 10 minutes. Pressing (at 80-100 psi) is then applied to drain the remaining whey and water off the curd. The pH of the curd, following pressing, is of the range of 5.3-5.4.

The resulting product is further processed using conventional processing steps, suited for the preparation of a hard cheese product, known by a person of ordinary skill.

Example 8: An Exemplary Method for the Making of a Soft Spreadable Cheese Alternative Raw milk of <4° C., was preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed milk at a flow rate 2000 liters per hour, via an insertion system of diameter 32 mm, fitted in close proximity and parallel configuration to the entrance system of fat cream re-feeding. Next, the oil-containing skimmed milk is directed along a tube to a homogenizer, wherein is subjected to mild homogenization at 10 bar. For example, homogenization may be performed using a conventional two-stage homogenizer (Piston diameter 55 mm) at 10 bar. The homogenized oil-containing milk mixture is pasteurized at 72° C. for 15 sec, and then cooled to 4-6° C. The resulting oil-containing milk mixture with a preferred ratio of fat/protein: 1:1.1 is preheated up to 25-30° C. and inoculated with a suitable mesophilic-thermophilic starter culture, until the pH reaches 6.2. Then, the appropriate amount of rennet (50% chymosin-50% pepsin) is added therein, for the coagulation to be completed after 12 hours. The curd is then cut into cubes of 2 cm×2 cm×2 cm and left at rest for 4-5 hours. The curd is then drained and salted (~2%) and finally molded. The smooth cheese is then stored at 4° C.

Example 9: An Exemplary Method for the Making of an Ice Cream Alternative Product Raw milk of <4° C., is preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed milk at a flow rate of 1000-2000 liters/hour, preferably at a rate greater than 1500 liters/hour and even more preferably at 2000 liters/hour, via an insertion system of diameter 32 mm, fitted in close proximity and parallel configuration to the entrance system of fat cream re-feeding.

Next, the oil-containing skimmed milk is directed along a tube to a homogenizer, where it is subjected to a mild homogenization. For example, the homogenization may be performed using a conventional two-stage homogenizer Piston diameter (55 mm) at 10 bar. The homogenized oil-containing milk mixture is subjected to pasteurisation (72° C. for 15 sec) and then cooled to 4-6° C. Appropriate amounts of sucrose (5.0-10.0 g/kg), glucose (5.0-10.0 g/kg) and carrageenan (5.0-10.0 g/kg) are then added thereto and mixed. The procedure follows with the optional addition of 100-200 g/kg of milk cream and 1-3 g/kg of glycerine monostearate and further mixing. The resulting mixture is then subjected to a heat treatment until a temperature of 68° C. has been reached and homogenization at 100 bar. The homogenized mixture is then pasteurized (78-80° C. for 20 to 25 seconds) and left to cool to 5° C. Incubation is performed at 5° C. for at least 4 hours to set the mixture and ensure an optimal "body" in the end product. Following the previous incubation step, the mixture is subjected to freezing and whipping ("churning") at −6° C. in order to develop the favourable ice crystal size and to incorporate a desirable amount of air ("overrun"). Addition of aromas (such as vanillin) and colourings (such as annatto) may be added according to regulation and supplier specification. Then, the mixture is filled and frozen at −40° C. (by a blast freezer), before storage at −20° C.

Example 10: An Exemplary Method for the Making of a Caramel Custard (Creme Caramel) Alternative Product Raw milk of <4° C., was preheated up to <55° C. Then, the preheated milk is introduced into a centrifugal separator, resulting in 50 vol-% fat cream and 0.03 vol-% fat skimmed milk.

Vegetable oil is preheated to 55° C. and then introduced into the skimmed milk at a flow rate 1000-2000 liters/hour, preferably at a rate greater than 1500 liters/hour and even more preferably at 2000 liters/hour, via an insertion system of diameter 32 mm, fitted in close proximity and parallel configuration to the entrance system of fat cream re-feeding.

Next, the oil-containing skimmed milk is directed along a tube to a homogenizer, where it is subjected to a mild homogenization. For example, the homogenization may be performed using a conventional two-stage homogenizer Piston diameter (55 mm) at 10 bar. The homogenized oil-containing milk mixture is pasteurized at 72° C. for 15 sec and then cooled to 4-6° C. Following cooling, the following ingredients are successively added and mixed therein: sucrose (90 g/kg) and optionally milk cream (40 g/kg). The procedure follows with the admixture of a mix of carrageenan and starches (e.g. tapioca starch, wheat starch and wheat semolina) 60 g/kg and further mixing. Then, 0.5 g/kg of vanillin and are added. For all the ingredients to be properly dissolved, a heat treatment step follows (90° C. for up to 30 min). The mixture is cooled to 70° C. before packaging. For caramel custard making, the packaging container is filled with a layer of caramel, prior to addition of the above milk-based mixture. Finally, the packaged dessert is stored at 4° C.

The invention claimed is:

1. A method for producing a milk-based alternative product, the method comprising:
    inserting an edible oil having a temperature of about 50 to 55° C., a pressure of about 2.5 bar, and a flow rate of about 500 to 2000 liters/h, into milk having a temperature of about 55° C. a pressure of about 2.3 bar, and a flow rate of about 10 to 12 tons/h, to obtain a mixture;
    mildly homogenizing the mixture at a pressure of about 10 bar;
    pasteurizing the homogenized mixture at a temperature of about 72° C. for about 15 sec; and
    cooling the pasteurized mixture to a temperature of about 4 to 6° C.;
    to obtain a milk-based alternative product comprising at least 5 (w/w) % fat.

2. The method of claim 1, wherein the milk is whole milk, semi-skimmed milk or skimmed milk.

3. The method of claim 2, wherein inserting the oil is performed by an insertion tube with a diameter of about 30 to 40 mm.

4. The method of claim 3, wherein the flow rate of the edible oil during the inserting is about 1000 to 2000 liters/h.

5. The method of claim 4, wherein the mild homogenizing is performed in a two-stage homogenizer with a piston diameter of about 55 mm.

6. The method of claim 5, wherein the cooled, pasteurized mixture comprises the edible oil at a concentration of about 4 to 17 (w/w) %.

7. The method of claim 6, wherein fat in the cooled, pasteurized mixture is a mixture of milk fat and edible oil.

8. A milk-based alternative product obtained by a method comprising:
    inserting an edible oil having a temperature of about 50 to 55° C., a pressure of about 2.5 bar, and a flow rate of about 500 to 2000 liters/h, into milk having a temperature of about 55° C., a pressure of about 2.3 bar, and a flow rate of about 10 to 12 tons/h, to obtain a mixture;
    mildly homogenizing the mixture at a pressure of about 10 bar;
    pasteurizing the homogenized mixture at a temperature of about 72° C. for about 15 sec; and
    cooling the pasteurized mixture to a temperature of about 4 to 6° C.;
    to obtain a milk-based alternative product comprising at least 5 (w/w) % fat.

9. The method of claim 1, wherein the obtained milk-based alternative product has a fat content of 5 to 30 (w/w) %.

10. The method of claim 1, wherein the obtained milk-based alternative product has a fat content of 5 to 25 (w/w) %.

11. The method of claim 1, wherein the obtained milk-based alternative product has a fat content of 5 to 20 (w/w) %.

12. The method of claim 2, wherein the milk is skimmed milk.

13. The method of claim 4, wherein the flow rate of the edible oil during the inserting is about 1500 to 2000 liters/h.

14. The method of claim 4, wherein the flow rate of the edible oil during the inserting is about 2000 liters/h.

15. The method of claim 6, wherein the cooled, pasteurized mixture comprises the edible oil at a concentration of about 8 to 17 (w/w) %.

16. The method of claim 6, wherein the cooled, pasteurized mixture comprises the edible oil at a concentration of about 9 to 17 (w/w) %.

17. The method of claim 7, wherein the edible oil is vegetable oil.

18. The method of claim 7, wherein the edible oil is olive oil.

19. The milk-based alternative product of claim 8, having a fat content of 5 to 30 (w/w) %.

20. The milk-based alternative product of claim 8, having a fat content of 5 to 25 (w/w) %.

21. The milk-based alternative product of claim 8, having a fat content of 5 to 20 (w/w) %.

* * * * *